US011948059B2

(12) United States Patent
Zhang et al.

(10) Patent No.: US 11,948,059 B2
(45) Date of Patent: Apr. 2, 2024

(54) MEDIA CAPTURE DEVICE WITH POWER SAVING AND ENCRYPTION FEATURES FOR PARTITIONED NEURAL NETWORK

(71) Applicant: International Business Machines Corporation, Armonk, NY (US)

(72) Inventors: Xin Zhang, Chappaqua, NY (US); Xiaodong Cui, Chappaqua, NY (US); Jin Ping Han, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 751 days.

(21) Appl. No.: 16/952,314

(22) Filed: Nov. 19, 2020

(65) Prior Publication Data

US 2022/0156550 A1   May 19, 2022

(51) Int. Cl.
*G06N 3/04* (2023.01)
*G06F 1/3246* (2019.01)
(Continued)

(52) U.S. Cl.
CPC .............. *G06N 3/04* (2013.01); *G06F 1/3246* (2013.01); *G06F 1/3287* (2013.01); *G06F 21/6209* (2013.01)

(58) Field of Classification Search
CPC ....... G06N 3/04; G06F 1/3246; G06F 1/3287; G06F 21/6209
See application file for complete search history.

(56) References Cited

U.S. PATENT DOCUMENTS

| 8,676,728 B1 * | 3/2014 | Velusamy | H04R 3/005 |
| | | | 706/62 |
| 10,338,913 B2 * | 7/2019 | Franchitti | H04L 67/34 |

(Continued)

FOREIGN PATENT DOCUMENTS

JP           2003016422 A  *  1/2003  ............. G06N 3/105

OTHER PUBLICATIONS

International Search Report and Written Opinion; dated Feb. 10, 2022; Application No. PCT/CN2021/129957; Filed: Nov. 11, 2021; 10 pages.

(Continued)

*Primary Examiner* — Shahid K Khan
(74) *Attorney, Agent, or Firm* — CANTOR COLBURN LLP; Erik Johnson

(57) ABSTRACT

A method for power saving and encryption during analysis of media captured by an information capture device using a partitioned neural network includes replicating, by an information capture device, an artificial neural network (ANN) from a computer server to the information capture device. The ANN on the computer server and a replicated ANN, both, include M layers. The method further includes, in response to captured data being input to be processed, partially processing, by the information capture device, the captured data by executing a first k layers using the replicated ANN, wherein only the k layers are selected to execute on the information capture device. The method further includes transmitting, by the information capture device, an output of the k-th layer to the computer server, which partially processes the captured data by executing the remainder of the M layers using the ANN and the output of the k-th layer.

19 Claims, 6 Drawing Sheets

(51) Int. Cl.
*G06F 1/3287* (2019.01)
*G06F 21/62* (2013.01)

(56) References Cited

U.S. PATENT DOCUMENTS

| | | | |
|---|---|---|---|
| 10,380,214 B1* | 8/2019 | Rausch | G06F 16/24573 |
| 10,650,032 B1* | 5/2020 | Laurence | G06F 16/30 |
| 2005/0111657 A1* | 5/2005 | Lee | H03M 7/4006 |
| | | | 380/28 |
| 2016/0117587 A1* | 4/2016 | Yan | G06N 3/08 |
| | | | 706/20 |
| 2016/0147621 A1* | 5/2016 | Portier | G06F 11/0709 |
| | | | 714/4.11 |
| 2017/0277994 A1* | 9/2017 | Sharifi | H04L 67/01 |
| 2019/0005375 A1* | 1/2019 | Mody | G06N 3/04 |
| 2019/0095629 A1* | 3/2019 | Lee | G06N 3/08 |
| 2020/0073581 A1* | 3/2020 | Croxford | G06F 3/0673 |
| 2020/0135720 A1 | 4/2020 | Brewer | |

OTHER PUBLICATIONS

Authors et. al.: Disclosed Anonymously, "Distributed Secure Cloud Storage," IP.com No. IPCOM000228225D:IP.com Electronic Publication Date: Jun. 13, 2013; 2 pages.

Authors et. al.: Disclosed Anonymously, "Secure Computation Architecture for Client-side Encryption," IP.com No. IPCOM000263004D: IP.com Electronic Publication Date: Jul. 21, 2020; 6 pages.

Authors et. al.: Disclosed Anonymously, "Sensor Network Trained To Understand Arbitrary Labels," IP.com No. IPCOM000255129D: IP.com Electronic Publication Date: Sep. 4, 2018 (23 pages).

Mayer, et al., "Scalable Deep Learning on Distributed Infrastructures: Challenges, Techniques and Tools," ACM Comput. Surv., vol. 1, No. 1, Article 1. Publication date: Sep. 2019; 35 pages.

Tang, et al., "Privacy-Preserving Distributed Deep Learning via Homomorphic Re-Encryption," Electronics 2019, 8, 411; doi:10.3390/electronics8040411; 21 pages.

Zhang, et al., "Deep Learning in Mobile and Wireless Networking: A Survey," IEEE Communications Surveys & Tutorials: Jan. 30, 2019; 67 pages.

* cited by examiner

MEDIA CAPTURE DEVICE WITH POWER SAVING AND ENCRYPTION FEATURES FOR PARTITIONED NEURAL NETWORK

BACKGROUND

The present invention generally relates to computing technology, and more specifically, to media capture devices and neural networks that facilitate the media capture devices to save power and secure data.

Today, several devices such as, phones, tablet computers, wearable devices, etc. capture and/or create media objects, such as digital images, audio, video, etc. With the increasing need for classifying large volumes of captured and/or extracted media, learning models have become a common practice for classifying the captured media objects. The learning models, such as for example, artificial neural networks (ANN) and/or convolutional neural networks (CNN), are trained with sample data, i.e. sample media objects and continuously evolve (learn) during the process of classifying new (previously unseen) media objects.

SUMMARY

One or more embodiments of the present invention include a computer-implemented method for power saving and encryption during analysis of media captured by an information capture device using a partitioned neural network. The method includes replicating, by an information capture device, an artificial neural network (ANN) from a computer server to the information capture device, wherein the ANN on the computer server and a replicated ANN on the information capture device, both, include M layers. The method further includes, in response to captured data being input to be processed, partially processing, by the information capture device, the captured data by executing a first k layers using the replicated ANN, wherein only the k layers are selected to execute on the information capture device. The method further includes transmitting, by the information capture device, an output of the k-th layer to the computer server, which partially processes the captured data by executing the remainder of the M layers using the ANN and the output of the k-th layer.

According to one or more embodiments of the present invention, a system includes a memory, and one or more processors coupled to the memory, wherein the one or more processors perform a method for power saving and encryption during analysis of media captured by an information capture device using a partitioned neural network. The method includes replicating, by an information capture device, an artificial neural network (ANN) from a computer server to the information capture device, wherein the ANN on the computer server and a replicated ANN on the information capture device, both, include M layers. The method further includes, in response to captured data being input to be processed, partially processing, by the information capture device, the captured data by executing a first k layers using the replicated ANN, wherein only the k layers are selected to execute on the information capture device. The method further includes transmitting, by the information capture device, an output of the k-th layer to the computer server, which partially processes the captured data by executing the remainder of the M layers using the ANN and the output of the k-th layer.

According to one or more embodiments of the present invention, a computer program product includes a computer readable storage medium having program instructions embodied therewith. The program instructions are executable by one or more processors to cause the one or more processors to perform a method including operations for power saving and encryption during analysis of media captured by an information capture device using a partitioned neural network. The method includes replicating, by an information capture device, an artificial neural network (ANN) from a computer server to the information capture device, wherein the ANN on the computer server and a replicated ANN on the information capture device, both, include M layers. The method further includes, in response to captured data being input to be processed, partially processing, by the information capture device, the captured data by executing a first k layers using the replicated ANN, wherein only the k layers are selected to execute on the information capture device. The method further includes transmitting, by the information capture device, an output of the k-th layer to the computer server, which partially processes the captured data by executing the remainder of the M layers using the ANN and the output of the k-th layer.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Embodiments of the present invention facilitate a media capture device with power saving and encryption features when using a partitioned neural network to process one or more media objects, such as images, audio, video, etc.

Nowadays, a large volume of data, such as images, audios, videos, etc. is created by multiple users using edge devices, such as phones, tablets, computers, wearable devices, dash-cameras, voice recorders, security cameras, etc. A technical challenge exists to process such a large volume of such data comprising media using deep neural network (DNN) architecture. Here, a "large volume" can entail millions of images, audio, video and processing and classifying such a volume of data manually is impractical, if not impossible. Accordingly, embodiments of the present invention provide a practical application to classifying large volume of media being captured by one or more information capture devices. Further, embodiments of the present invention improve the operations of the information capture devices by facilitating the information capture devices to save power and to secure data. Further yet, embodiments of the present invention address the limited computation resources on the information capture devices by improving the computational efficiency of the information capture devices during such media classification tasks.

Figure 1:
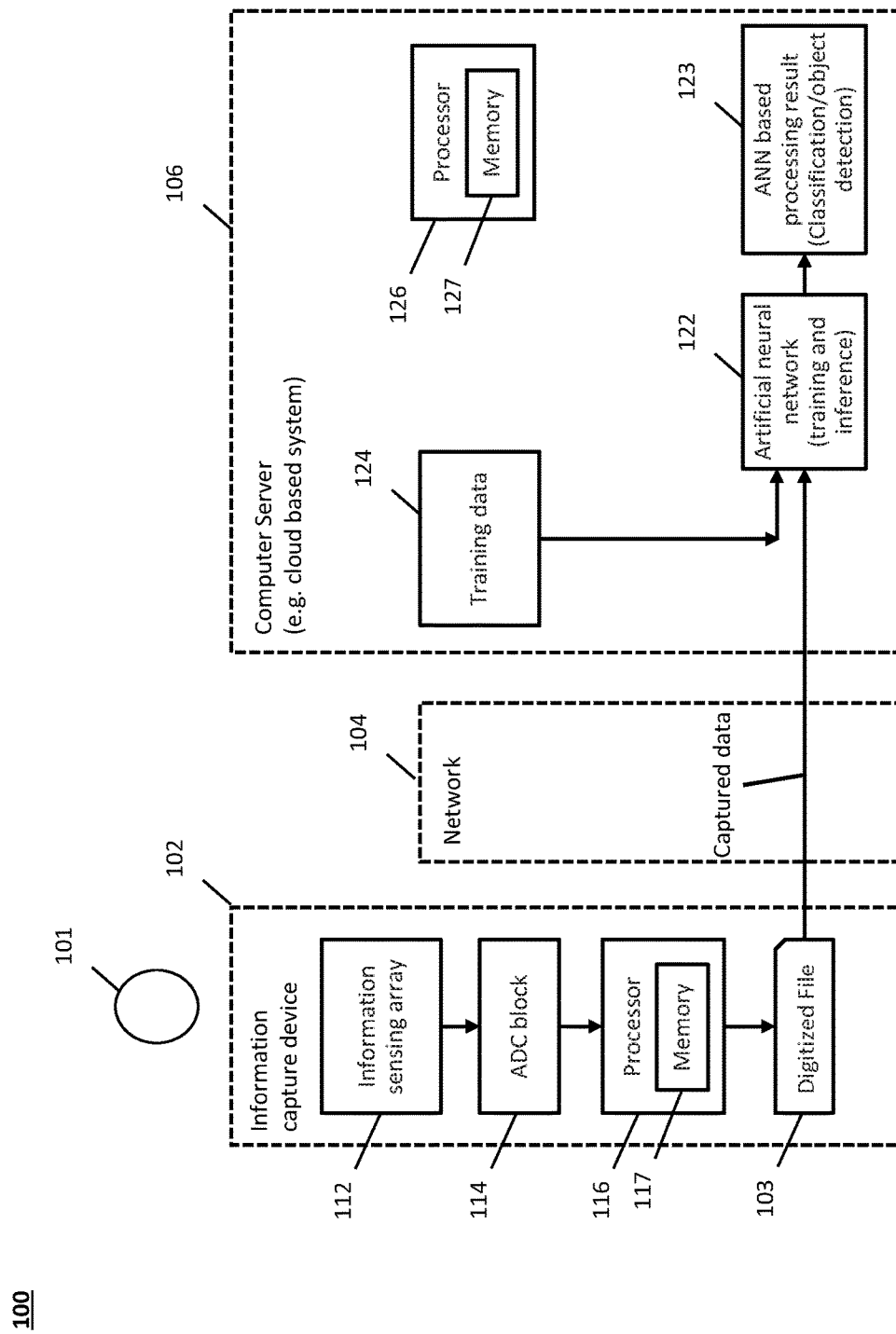
FIG. 1 is a block diagram of a system for power saving and encryption during analysis of a media captured by an information capture device using a partitioned neural network according to one or more embodiments of the present invention.

FIG. 1 depicts a block diagram of a system 100 for processing information captured by one or more information capture devices according to one or more embodiments of the present invention. An information capture device 102 (e.g., camera, phone, security camera, tablet computer, voice recorder etc.) captures information as analog signals that can be stored in one or more digitized files 103. The analog signals sensed by an information sensing array 112 of the information capture device 102 are digitized by an analog-to-digital (ADC) module 114. The information capture device 102 can further include a processor 116 that can perform one or more digital signal processing operations on the digitized data, for example, image processing, audio processing, video processing, etc. The processor 116 can save the digitized data as digitized files 103. The digitized files 103 can be saved as electronic files using one or more digital file storage formats. For example, visual information captured by the information sensing array 112 can be stored using image file formats such as, portable network graphics (PNG), bitmap (BMP), etc. In the case of audio data that is sensed by the information sensing array 112, the digitized audio can be stored using file formats such as, waveform audio file format (WAV), free lossless audio codec (FLAC), etc. In case of video being captured, the data can be stored using digital file formats such as video object (VOB), audio video interleave (AVI), MPEG-14, etc.

In one or more embodiments of the present invention, the processor 116 can include one or more processing units, such as processor cores etc. The processor 116 can be a microprocessor, a multiprocessor, a digital signal processor, a graphics programming unit, a central processing unit, and other such type of a processing unit, or a combination thereof. The processor 116 can include, or be coupled with memory devices 117. The processor 116 can perform one or more operations by executing one or more computer executable instructions. Such instructions may be stored on the memory devices 117. The memory devices 117 can store additional information/data that can be used or output by the processor 116.

Captured data from the digitized files 103 is transferred through a communication network 104 to a computer server 106 for further processing, such as the classification of the digitized files 103.

The communication network 104 can be a computer network, such as the Internet, that uses one or more communication protocols, such as Ethernet, etc. In one or more embodiments of the present invention, the digitized files 103 are captured by users 101 using the information capture device 102.

The computer server 106 can be a server cluster, or a distributed server that provides a cloud-based processing service for the digitized files 103 captured by the information capture devices 102. In one or more embodiments of the present invention, the computer server 106 includes an artificial neural network (ANN) 122. The ANN 122 can be a convolutional neural network, a feedforward network, recurrent neural network, multilayer perceptron, or a combination thereof. The ANN 122 can be an independent hardware module in one or more embodiments of the present invention. Alternatively, or in addition, the ANN 122 can be implemented using a processor 127 of the computer server 106. The ANN 122 includes multiple layers in which output of one layer is used by a subsequent layer until a final output 123 is generated.

In one or more embodiments of the present invention, the processor 126 can include one or more processing units, such as processor cores etc. The processor 126 can be a microprocessor, a multiprocessor, a digital signal processor, a graphics programming unit, a central processing unit, and other such type of a processing unit, or a combination thereof. The processor 126 can include, or be coupled with memory devices 127. The processor 126 can perform one or more operations by executing one or more computer executable instructions. Such instructions may be stored on the memory devices 127. The memory devices 127 can store additional information/data that can be used or output by the processor 126.

In one or more embodiments of the present invention, the ANN 122 is trained using a training data 124. The training data 124 includes predefined media such as, images, audio, video, etc., that can include labels and other hints that can train the ANN 122 to analyze the captured data from the information capture device 102 during an inference phase and generate ANN output 123. The ANN output 123 can include classification of the digitized files 103 into one or more categories, object detection results of the digitized files 103, and other such image processing/computer vision, and audio processing results.

In conventional systems, the digitized files 103 are encrypted before sending the digitized files 103 to the server 106. If the encryption is compromised (i.e., hacked), the captured data from the digitized files 103 can be exposed.

Embodiments of the present invention integrate the neural network analysis with the encryption, by splitting the ANN 122 and creating a replica of the ANN 122 on the information capture device 102. In one or more embodiments, the captured data is first processed through one or more layers of the ANN 122, then the output of the ANN 122 is sent through network 104 to the computer server 106 for further processing with the rest of layers of the ANN 122.

Alternatively, in other embodiments, the analog signals sensed by the information sensing array 112 on the information capture device 102 is first connected through one or more layers of the ANN 122. The output of the one or more layers of the ANN 122 is sent through network 104 to the computer server 106 for further processing with the rest of the layers of the ANN 122.

In embodiments of the present invention, encryption can also be done for the weights of the one or more intermediate layers of the ANN 122 and the output of the intermediate layers of the ANN 122. In this way, captured data is not being transferred through the network 104, thus improving the security of the captured data. Embodiments of the invention provide improvements to the system 100, and the components of the system 100, such as the information capture device 102, the computer server 106, and to one or more methods of using the system 100 and/or the components of the system 100, for example, to analyze digitized files 103 captured by the information capture device 102 in a secure manner.

Figure 2:
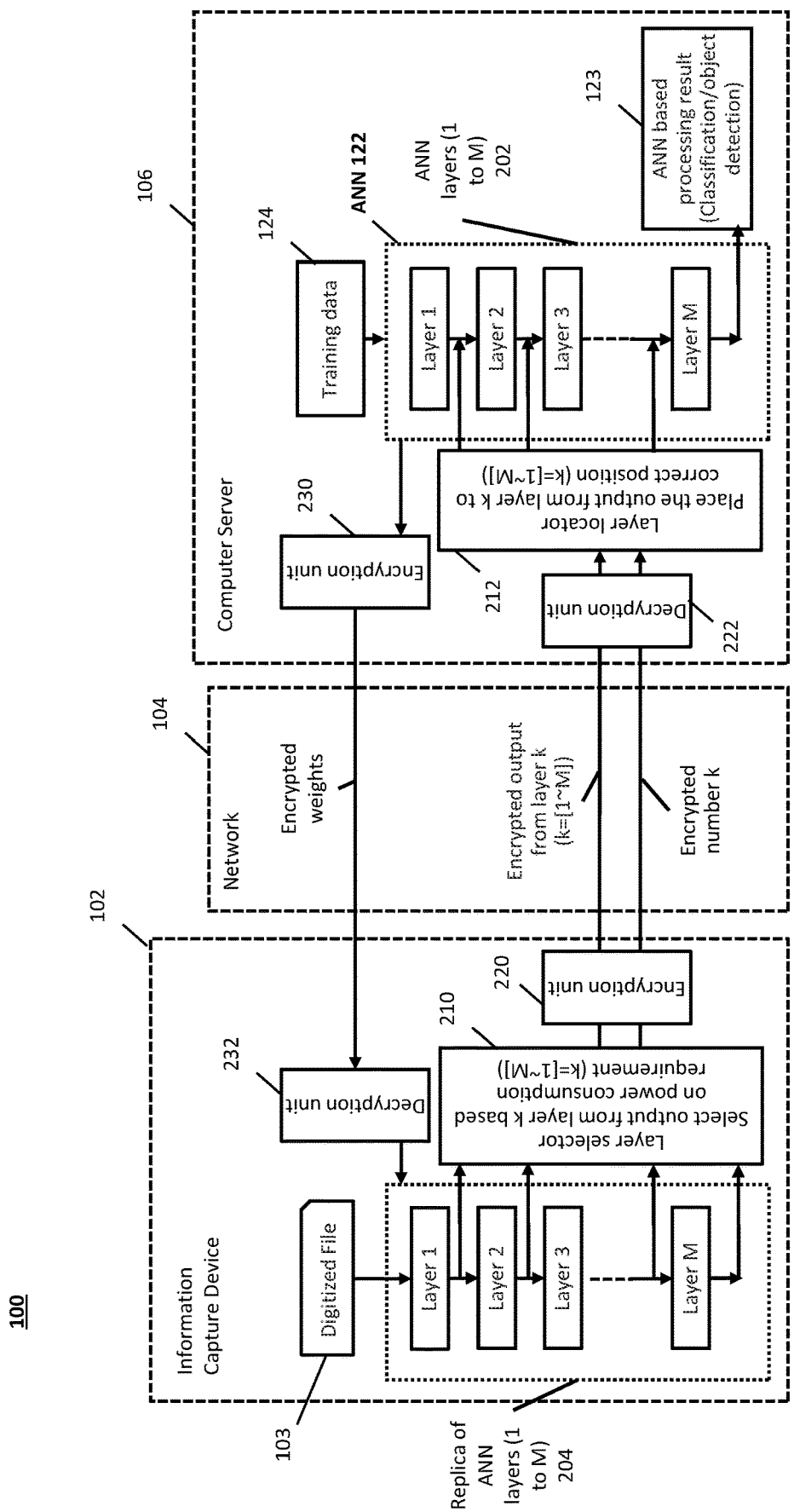
FIG. 2 is a block diagram of a system for power saving and encryption during analysis of a media captured by an information capture device using a partitioned neural network according to one or more embodiments of the present invention.

FIG. 2 is a block diagram that depicts improvements of one or more components of the system 100 for power saving and encryption of captured data for using a partitioned neural network according to one or more embodiments of the present invention. The depiction illustrates the layers 202 in the ANN 122. The ANN 122 can include M layers, where M is any integer. Each layer uses the output from a previous layer except layer #1.

The ANN 122 is trained using the training data 124. Such a training includes learning (i.e., configuring, setting up) one or more weights associated with each of the layers 202 of the ANN 122. The weights are learned automatically using one or more training techniques, such as supervised learning, unsupervised learning, or any other learning techniques for the ANN 122.

The information capture device 102 includes an ANN-replica 204, which is a replica of the ANN 122. The ANN-replica 204 is identical to the ANN 122, and includes the same M layers. Further, to make the ANN-replica 204 identical to the ANN 122, the weights that are learned by the ANN 122 are transmitted to the ANN-replica 204 on the information capture device 102. In one or more embodiments of the present invention, the weights are encrypted by an encryption unit 230 of the computer server 106. A decryption unit 232 of the information capture device 102 decrypts the encrypted weights from the encryption unit 230. The decrypted weights outputted by the decryption unit 232 are configured in the ANN-replica 204.

The information capture device 102 further includes a layer selector 210 that selects how many of the M layers from the ANN-replica 204 are to be executed on the information capture device for analyzing a digitized file 103 that is created by the information capture device 102. For example, the layer selector 210 can select that the first k layers (1≤k≤M) of the ANN-replica 204 be executed by the information capture device 102 with the digitized file 103 as input. In one or more embodiments of the present invention, the layer selector 210 determines the value of k based on power consumed by the information capture device 102 to execute the layers of the ANN-replica 204. In other embodiments, additional or alternative parameters can be used to select the value of k.

The output of the layer #k from the ANN-replica 204, with the digitized file 103 as the input to the replica-ANN 204, is transmitted to the computer server 106. In one or more embodiments of the present invention, the output of layer #k is encrypted by an encryption unit 220 of the information capture device 102 prior to the transmission. A decryption unit 222 of the computer server 106 decrypts the output of the layer #k. This received output of layer #k is input to the layer #(k+1) of the ANN 122. In one or more embodiments of the present invention, a layer locator 212 of the computer server 104 identifies the layer #(k+1) in the ANN 122 and inputs the received output of layer #k to that layer #(k+1) in the ANN 122.

In one or more embodiments of the present invention, the layer selector 210 transmits, to the layer locator 212, the identity of the layer for which the output is being sent, i.e., layer #k. The identity of the layer #k is encrypted by the encryption unit 220 prior to transmission, in one or more embodiments of the present invention. The decryption unit 222 decrypts the identity of the layer #k, for use by the layer locator 212.

The layers (k+1) to M of the ANN 122 are subsequently executed to generate the result 123 of the ANN 122. In one or more embodiments of the present invention, the result 123 is transmitted to the information capture device 102, or to any other device (not shown).

The system 100, accordingly, facilitates a variable division of workload in which a subset of the layers of the ANN are executed on the information capture device 102 and the rest of the layers are executed on the computer server 104. Further, the data that is exchanged between the information capture device 102 and the computer server 104 is secured and even then only intermediate data is exchanged to limit exposure of the entire digitized file 103, and in turn to limit possibility of the digitized file 103 being hacked during such exchange of data.

In one or more embodiments of the present invention, the information capture device 102 transmits output of each of the layers that are executed by the ANN-replica 204, i.e., layers 1-k, along with the identity of the layer #k.

In one or more embodiments of the present invention, the ANN-replica 204 uses the analog signals that are captured by the information sensing array 112, prior to the captured data being converted into the digitized file 103. This facilitates securing the captured data further from being compromised. In this case, the ANN 122 is trained using training data 124 that includes analog signals.

Figure 3:
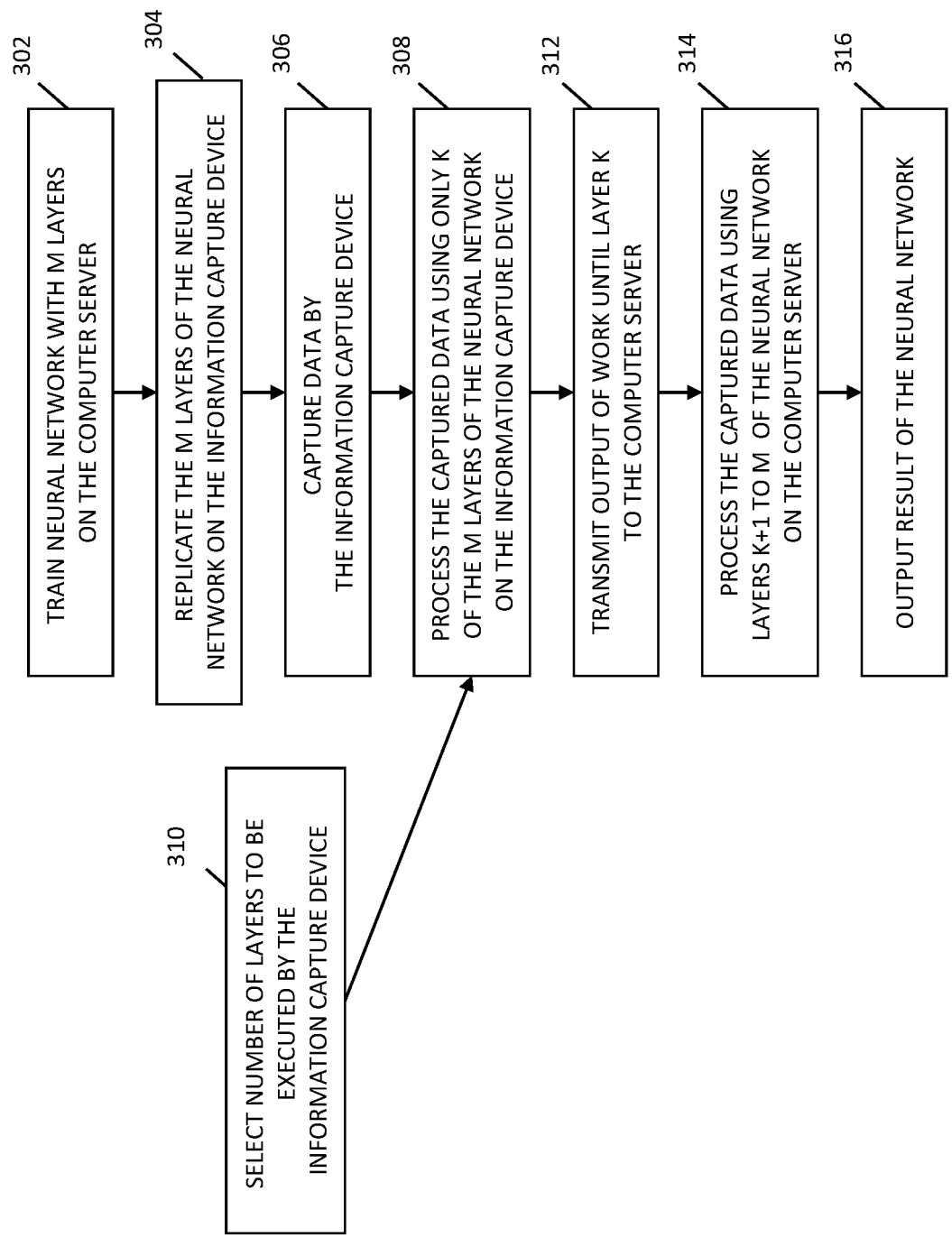
FIG. 3 is a flowchart of a method for power saving and encryption during analysis of a media captured by an information capture device using a partitioned neural network according to one or more embodiments of the present invention.

FIG. 3 depicts a flowchart of a method 300 of analyzing captured data with power saving and encryption using a partitioned neural network according to one or more embodiments of the present invention. The method 300 includes training the ANN 122 of the computer server 106 using the training data 124, at block 302. The training can include supervised learning, unsupervised learning, or any other type of neural network training. The training data 124 can include analog signals captured by information sensing arrays such as the information sensing array 112. Alternatively, or in addition, the training data 124 can include media that are obtained after digitizing such analog signals. The training facilitates the M layers 202 of the ANN 122 to be configured with weights. Here, "weight" is a parameter within the ANN 122 that transforms input data that is provided to any of the M layers 202. Each of the M layers 202 can include multiple weights. The ANN 122 is trained to analyze the captured data, either in the form of analog signals captured by an information sensing array 112, or in the form of a digitized file 103. For example, such an analysis can include detection and identification of objects in the captured data. Further, the analysis can include classifying the identified objects, and/or the captured data into one or more categories. Other types of analysis can be additionally or alternatively performed in one or more embodiments of the present invention.

Further, at block 304, the ANN 122 is replicated on the information capture device 102. The replication includes configuring the ANN-replica 204 on the information capture device 102. The ANN-replica 204 is configured with the same number of layers, i.e. M. Further, each of the layers of the ANN-replica 204 are configured with the exact same weights as the M layers 202 of the ANN 122 of the computer server 106. In one or more embodiments of the present invention, such a replication includes encrypting the trained weights using the encryption unit 230, and transmitting the encrypted values to the information capture device 102. The decryption unit 232 decrypts the weight values, which are then used to configure the ANN-replica 204.

Subsequently, at block 306, the information capture device 102 captures an analog signal data using the information sensing array 112. The captured data is input to the ANN-replica 204 of the information capture device 102 for processing using only k of the M layers of the ANN-replica 204, at block 308. The captured data that is input to the ANN-replica 204 can be the analog signals captured by the information sensing array 112, or the corresponding digitized file 103.

Processing the captured data includes selecting the number of layers, i.e., k, to be executed by the information capture device 102, at block 310. The layer selector 210 determines the value of k based on one or more factors associated with the information capture device. In one or more embodiments of the present invention, the layer selector 210 monitors an amount of power consumed to execute each of the layers of the ANN-replica 204. Alternatively, or in addition, the layer selector 210 has access to power consumption data that indicates amount of power required to execute each of the layers of the ANN-replica 204 by the information capture device 102. In one or more embodiments of the present invention, the layer selector 210 may further include a power consumption budget for the ANN-replica 204. The power consumption budget can be a configurable value.

The power consumption budget indicates a maximum amount of power that the ANN-replica 204 can consume to analyze the captured data. In one or more embodiments of the present invention, the power consumption budget can be a value that depends on a total amount of power that is available to the information capture device 102. For example, if the information capture device 102 is receiving power from a battery or any other such limited power source (not shown), the amount of power that is available can depend on a charge-level of the power source. As the charge-level changes, the power consumption budget can change. For example, the power consumption budget for the ANN-replica 204 can be 100 milliwatts to analyze the captured data if the charge-level is at least 75% of the capacity of the power source; the power consumption budget reduces to 80 milliwatts when the charge-level drops to 50%; further reduces to 50 milliwatts when the charge-level drops to 30%, and so on. It is understood that the above example values can vary in one or more embodiments of the invention. In one or more embodiments of the present invention, the relationship between the power consumption budget and the charge-level can be configurable.

Accordingly, based on the power consumption budget that is determined, and the amount of power required for each of the layers in the ANN-replica 204, the layer selector determines that k layers can be executed by the information capture device 102 without exceeding the power consumption budget. In response, the first k layers of the ANN-replica 204 are executed by the information capture device 102 (at block 308).

Because the ANN-replica 204 includes the exact replicas of the M layers 202 of the ANN 122, the remaining layers of the ANN 122 (k+1) to M, can take over the analysis of the captured data. To this end, at block 312, the output of the layer #k from the ANN-replica 204 is transmitted to the computer server 106 via the network 104. The transmission can further include the identity of the layer k, for example, the value of k.

In one or more embodiments of the present invention, the transmission is encrypted by the encryption unit 220. The output of the layer #k and the identity of k can be part of a single encrypted transmission in one or more embodiments of the present invention. Alternatively, separate encrypted transmissions can be performed for the output of the layer #k and the identity of k.

At block 314, the ANN 122 analyzes the captured data by executing the layers (k+1) to M using the output of the layer #k. Such analysis includes decrypting, by the decryption unit 222, the information received from the information capture device 102. Further, the layer locator 212 identifies the layer #k and #k+1 of the ANN 122 and configures these layers with the information from the information capture device 102 so that the ANN 122 can execute the remainder of the M layers from the layer #k+1.

At block 316, the result of the processing the ANN 122 is output. The result can be transmitted to the information capture device 102 in one or more embodiments of the present invention. Alternatively, or in addition, the result can be transmitted to another device, such as another computer server, a database, or any other device.

It should be noted that although FIGS. 1 and 2 depict a single information capture device 102, in one or more embodiments of the present invention, multiple information capture devices 102 can be communicating with the computer server 106. Further, each information capture device 102 can have its own power consumption budget, charge-level, and other such varying factors. Accordingly, the number of layers executed on a first information capture device 102 can vary from the number of layers, say k' (k≠k'), on a second information capture device. In response, for the first information capture device, the computer server 106 executes a different number of layers (M−k), compared to the number of layers executed for the second information capture device (M−k').

Further, even for a single information capture device 102, the number of layers k can vary based on the charge-level. For example, the computer server 106 can execute (M-k) layers of the ANN 122 for a first captured data that is captured by the information capture device 102 at time t1, when the charge-level is X %; whereas, the computer server 106 executes (M-p) layers of the ANN 122 for a second captured data that is captured by the information capture device 102 at time t1, when the charge-level is Y %, p being the number of layers selected by the layer selector 210.

Embodiments of the present invention integrate the neural network process with encryption, by partitioning the neural network and creating a replica of the neural network on the information capture devices. The captured data is analyzed using a subset of layers of the neural network at the information capture device, the output of such processing is transmitted to a computer server for further processing using a remainder of the layers of the neural network. The number of layers to execute at the information capture device is based on one or more factors, such as power consumption, at the information capture device. The captured data can be used in the form of analog signals or in the form of a digitized file. Further, all of the transmissions, such as the weights for replicating the neural network, the output of the layers executed on the information capture device, etc. are encrypted. In this way, the captured data is not directly transferred through the network, in turn increasing the security of the captured data.

Figure 4:
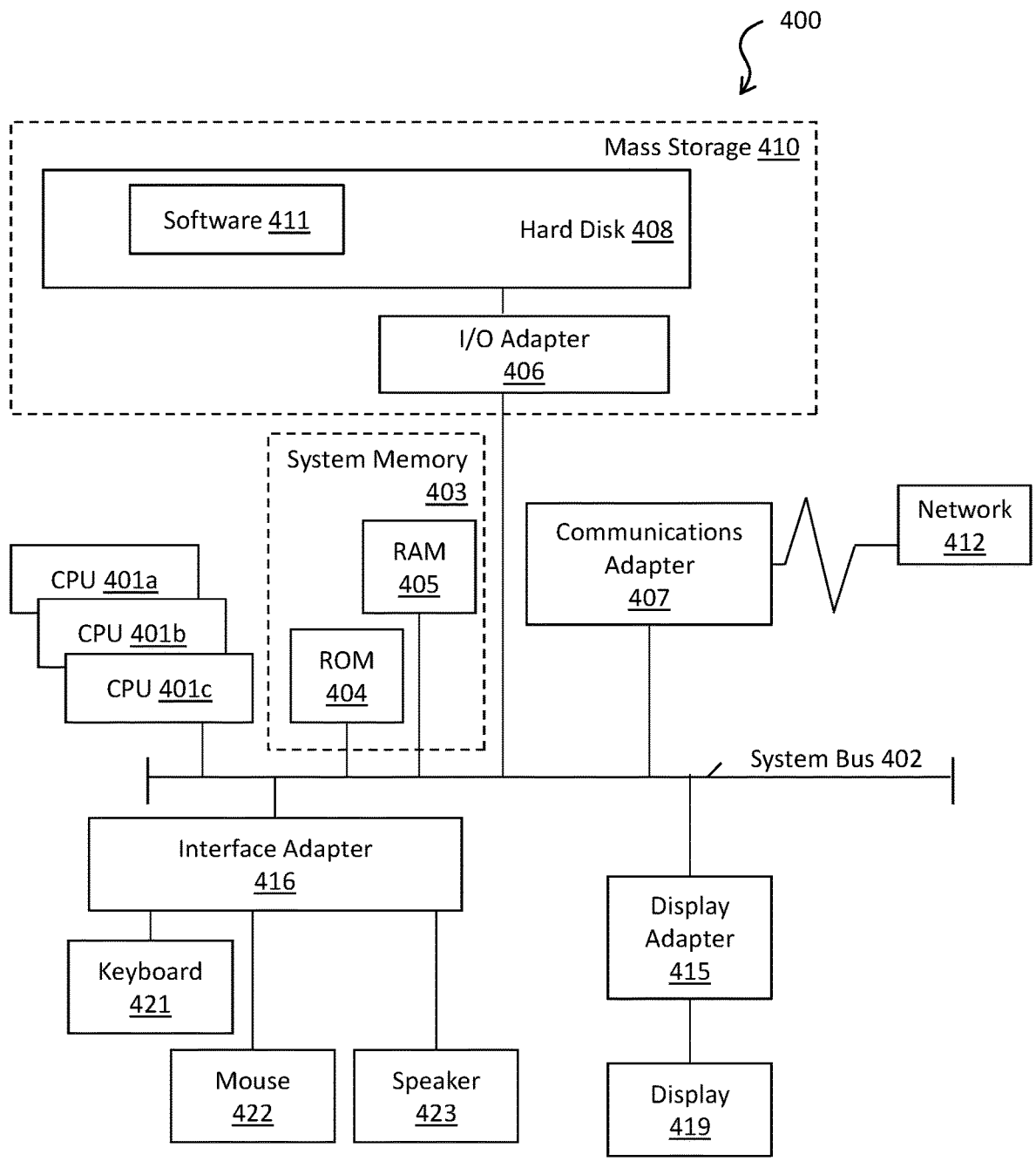
FIG. 4 depicts a computer system that implements one or more embodiments of the present invention.

Turning now to FIG. 4, a computer system 400 is generally shown in accordance with an embodiment. The computer system 400 can be used as the information capture device 102 and/or the computer server 106 in one or more embodiments of the present invention. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random-access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AIX operating system from IBM Corporation, to coordinate the functions of the various components shown in FIG. 4.

Additional input/output devices are shown as connected to the system bus 402 via a display adapter 415 and an interface adapter 416 and. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
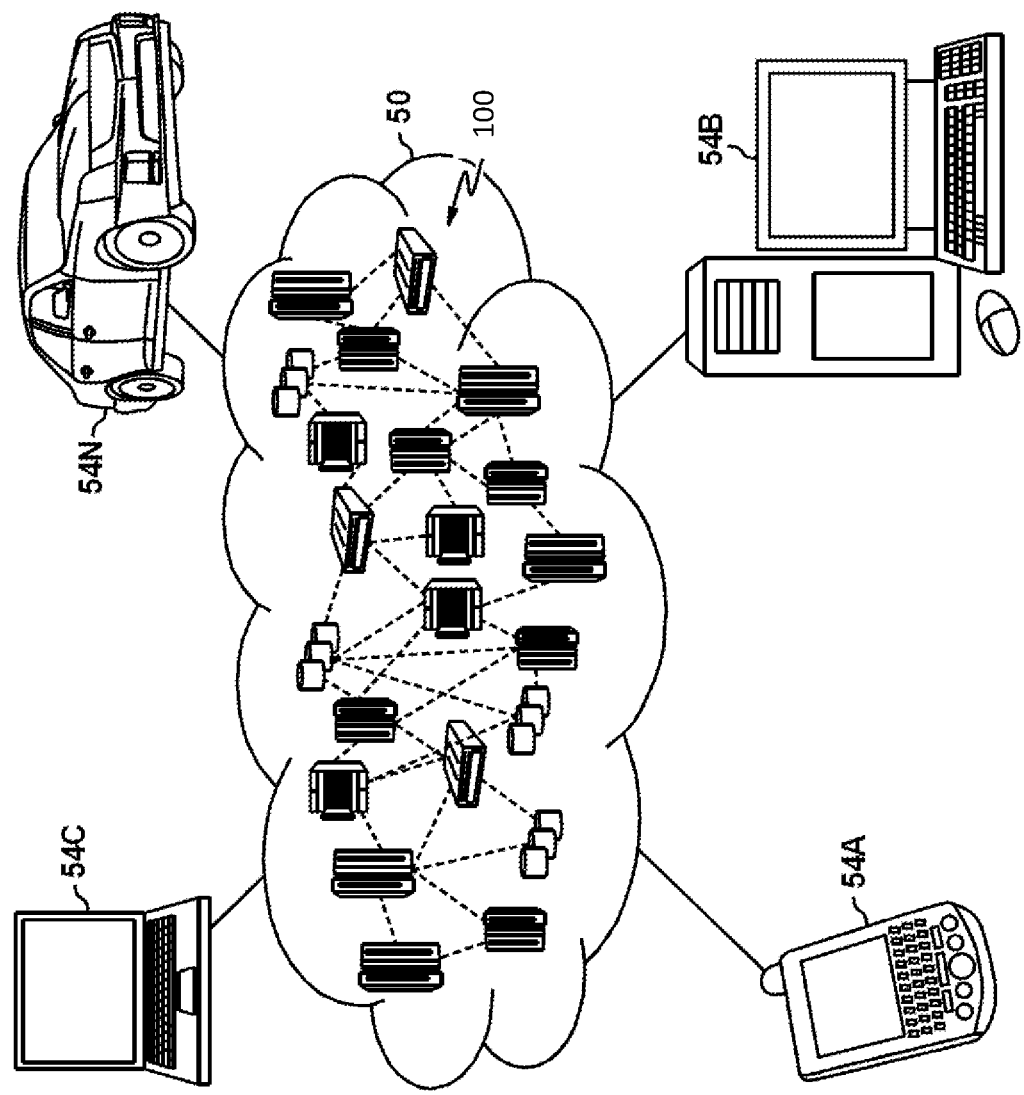
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
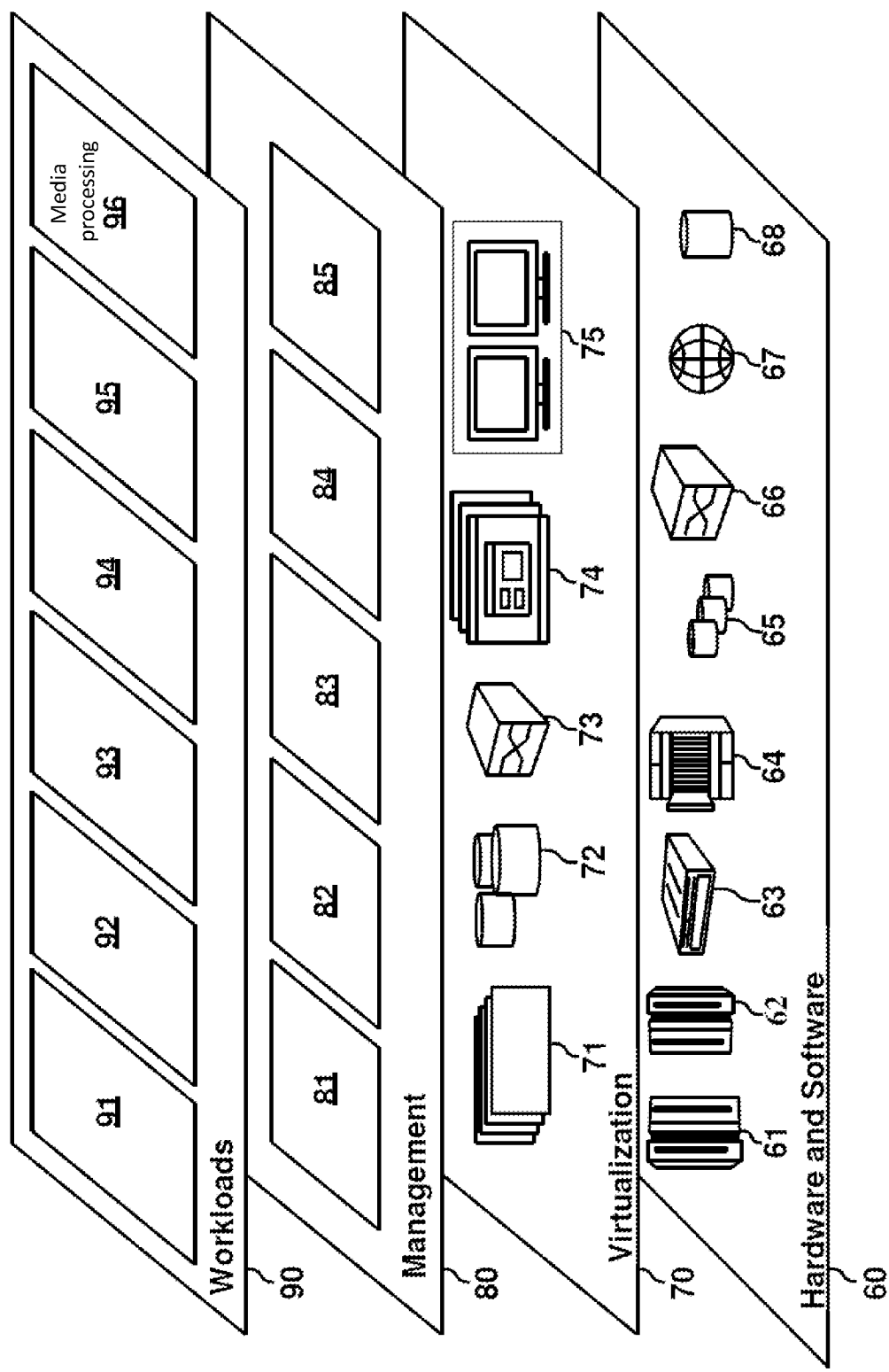
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and media processing and classification 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for power saving and encryption during analysis of media captured by an information capture device using a partitioned neural network, the computer-implemented method comprising:

replicating, by an information capture device, an artificial neural network (ANN) from a computer server to the information capture device, wherein the ANN on the computer server and a replicated ANN on the information capture device, both, include M layers;

in response to captured data being input to be processed, selecting, by the information capture device, a first k layers to execute on the information capture device, and transmitting a value of k to the computer server;

in response to captured data being input to be processed, partially processing, by the information capture device, the captured data by executing the first k layers using the replicated ANN, wherein only the k layers are selected to execute on the information capture device; and transmitting, by the information capture device, an output of the k-th layer to the computer server, which partially processes the captured data by executing the remainder of the M layers using the ANN and the output of the k-th layer, wherein the value of k is selected by the information capture device based at least in part on a charge-level of a power source of the information capture device.

2. The computer-implemented method of claim 1, further comprising receiving, by the information capture device, a result of the ANN from the computer server.

3. The computer-implemented method of claim 1, wherein the ANN is trained by the computer server prior to the ANN being replicated on the information capture device.

4. The computer-implemented method of claim 1, wherein the captured data comprises analog signals captured by an information sensing array.

5. The computer-implemented method of claim 1, wherein the captured data comprises a digitized media.

6. The computer-implemented method of claim 1, wherein replicating the ANN to the information capture device comprises copying one or more weights of each of the M layers of the ANN to corresponding M layers of the replicated ANN.

7. The computer-implemented method of claim 6, wherein the one or more weights are encrypted prior to transmission to the information capture device.

8. The computer-implemented method of claim 1, further comprising encrypting the output of the k-th layer prior to transmitting the output to the computer server.

9. The computer-implemented method of claim 1, further comprising encrypting the value of k prior to transmission to the computer server.

10. A system comprising:
a memory; and
one or more processors coupled to the memory, wherein the one or more processors are configured to perform a method for power saving and encryption during analysis of media captured by an information capture device using a partitioned neural network, the method comprising:

replicating an artificial neural network (ANN) from a computer server to the information capture device, wherein the ANN on the computer server and a replicated ANN on the information capture device, both, include M layers;

selecting k layers to execute on the information capture device, wherein k is selected by based at least in part on a charge-level of a power source of the information capture device;

in response to captured data being input to be processed, partially processing the captured data by executing the first k layers using the replicated ANN; and transmitting an output of the k-th layer to the computer server, which partially processes the captured data by executing the remainder of the M layers using the ANN and the output of the k-th layer.

11. The system of claim 10, wherein the ANN is trained by the computer server prior to the ANN being replicated on the information capture device.

12. The system of claim 10, wherein the captured data comprises analog signals captured by an information sensing array.

13. The system of claim 10, wherein the captured data comprises a digitized media.

14. The system of claim 10, wherein the method further comprises encrypting the output of the k-th layer prior to transmitting the output to the computer server.

15. The system of claim 10, wherein the method further comprises encrypting and transmitting a value of k to the computer server.

16. A computer program product comprising a computer readable storage medium having program instructions embodied therewith, the program instructions executable by one or more processors to cause the one or more processors to perform operations for power saving and encryption during analysis of media captured by an information capture device using a partitioned neural network, the operations comprising:

replicating, by the information capture device, an artificial neural network (ANN) from a computer server to the information capture device, wherein the ANN on the computer server and a replicated ANN on the information capture device, both, include M layers;

in response to captured data being input to be processed, selecting, by the information capture device, a first k layers to execute on the information capture device, and transmitting a value of k to the computer server;

in response to captured data being input to be processed, partially processing, by the information capture device, the captured data by executing a first k layers using the replicated ANN, wherein only the k layers are selected to execute on the information capture device; and transmitting, by the information capture device, an output of the k-th layer to the computer server, which partially processes the captured data by executing the remainder of the M layers using the ANN and the output of the k-th layer, wherein the value of k is selected by the information capture device based at least in part on a charge-level of a power source of the information capture device.

17. The computer program product of claim 16, wherein the captured data comprises analog signals captured by an information sensing array.

18. The computer program product of claim 16, wherein the captured data comprises a digitized media.

19. The computer program product of claim 16, wherein the operations further comprise encrypting the output of the k-th layer prior to transmitting the output to the computer server.

* * * * *